(12) United States Patent
Melsert

(10) Patent No.: US 9,827,602 B2
(45) Date of Patent: Nov. 28, 2017

(54) CLOSED-LOOP THERMAL SERVICING OF SOLVENT-REFINING COLUMNS

(71) Applicant: Tesla Motors, Inc., Palo Alto, CA (US)

(72) Inventor: Ryan Melsert, Reno, NV (US)

(73) Assignee: TESLA, INC., Palo Alto, CA (US)

(*) Notice: Subject to any disclaimer, the term of this patent is extended or adjusted under 35 U.S.C. 154(b) by 0 days.

(21) Appl. No.: 14/867,604

(22) Filed: Sep. 28, 2015

(65) Prior Publication Data

US 2017/0087605 A1   Mar. 30, 2017

(51) Int. Cl.
| | | |
|---|---|---|
| B08B 9/08 | (2006.01) | |
| B01D 3/00 | (2006.01) | |
| B01D 1/00 | (2006.01) | |
| B01D 1/28 | (2006.01) | |
| B01D 3/14 | (2006.01) | |
| B01D 5/00 | (2006.01) | |

(52) U.S. Cl.
CPC .............. *B08B 9/08* (2013.01); *B01D 1/0047* (2013.01); *B01D 1/28* (2013.01); *B01D 3/00* (2013.01); *B01D 3/007* (2013.01); *B01D 3/143* (2013.01); *B01D 5/0039* (2013.01)

(58) Field of Classification Search
CPC .. C07D 295/00; C07D 207/00; C07D 207/26; C07D 207/263; C07D 207/267; C07D 207/27; C07D 207/273; C07D 207/277; C07D 207/28; B08B 9/08; B01D 3/00; B01D 1/0047; B01D 5/0039; B01D 3/007; B01D 3/143; B01D 1/28
See application file for complete search history.

(56) References Cited

U.S. PATENT DOCUMENTS

| | | | | |
|---|---|---|---|---|
| 2,198,263 A | * | 4/1940 | Brandt ................. | C10G 7/02 196/132 |
| 2,415,101 A | * | 2/1947 | Denton ................. | C07C 37/58 568/802 |
| 2,723,940 A | * | 11/1955 | Fenske ................. | C10G 21/28 196/134 |
| 3,260,059 A | * | 7/1966 | Rosenberg ............ | C01B 7/01 203/40 |
| 3,404,072 A | * | 10/1968 | Bollen ................. | C01C 1/10 203/1 |
| 3,485,886 A | * | 12/1969 | Mitchell .............. | C07C 7/005 208/100 |
| 3,568,457 A | * | 3/1971 | Briggs et al. ......... | C07C 7/04 203/26 |
| 3,600,283 A | * | 8/1971 | Bollen et al. ......... | C01C 1/10 202/160 |
| 4,294,080 A | | 10/1981 | Cohen | |

(Continued)

*Primary Examiner* — Michael Kornakov
*Assistant Examiner* — Benjamin L Osterhout
(74) *Attorney, Agent, or Firm* — Garlick & Markison; Bruce E. Garlick

(57) ABSTRACT

A method of thermally servicing a solvent-refining column comprises: running a closed-loop water-steam system past a top and bottom of a first column, the first column containing at least a solvent and impurities; boiling pressurized water in the closed-loop water-steam system to steam using first heat from the top of the first column; compressing the steam in the closed-loop water-steam system to a higher temperature; and providing second heat to the first column by condensing the steam at the bottom of the first column after compression.

9 Claims, 2 Drawing Sheets

(56) References Cited

U.S. PATENT DOCUMENTS

| | | | |
|---|---|---|---|
| 4,294,689 A | 10/1981 | Sequeira, Jr. | |
| 4,345,971 A | 8/1982 | Watson | |
| 4,433,554 A | 2/1984 | Rojey | |
| 5,249,436 A * | 10/1993 | Hemsath | F25B 15/04 62/101 |
| 5,925,223 A * | 7/1999 | Simpson | B01D 3/065 159/17.1 |
| 6,250,106 B1 | 6/2001 | Agrawal | |
| 7,183,019 B2 | 2/2007 | Kim | |
| 8,519,157 B2 | 8/2013 | Zhan | |
| 2005/0119494 A1* | 6/2005 | Fischer | C07D 307/08 548/554 |
| 2010/0275645 A1* | 11/2010 | Van De Rijt | F25B 25/005 62/613 |
| 2013/0227986 A1* | 9/2013 | Sadler | B01D 3/007 62/620 |

\* cited by examiner

CLOSED-LOOP THERMAL SERVICING OF SOLVENT-REFINING COLUMNS

BACKGROUND

Solvents are used in many industrial processes to clean or otherwise alter the state of various materials. In such use, the solvent may be degraded, for example by the inclusion of impurities. It may be possible to restore the degraded solvent by distillation or another refinement process. However, these processes can be energy intensive.

SUMMARY

In a first aspect, a method of thermally servicing a solvent-refining column comprises: running a closed-loop water-steam system past a top and bottom of a first column, the first column containing at least a solvent and impurities; boiling pressurized water in the closed-loop water-steam system to steam using first heat from the top of the first column; compressing the steam in the closed-loop water-steam system to a higher temperature; and providing second heat to the first column by condensing the steam at the bottom of the first column after compression.

Implementations can include any or all of the following features. Water is separated from the solvent and the impurities in a second column, the method further comprising providing third heat to the second column by condensing the steam at a bottom of the second column after compression. The method further comprises selectively bypassing, at least partially, the bottom of the first or second column with the closed-loop water-steam system. The method further comprises applying a heater to the steam after the compression and before the bottom of the second column. The method further comprises selectively bypassing, at least partially, the bottom of the first column with the closed-loop water-steam system. The method further comprises applying a heater to the steam after compression and before the bottom of the first column. The impurities have a boiling point that is less than about 2% lower or higher than a boiling point of the solvent. The method further comprises selectively bypassing, at least partially, the top of the first column with the closed-loop water-steam system. The solvent is n-methyl pyrrolidone and wherein the impurities are partial oxides of the n-methyl pyrrolidone. The method further comprises throttling condensed water in the closed-loop water-steam system before boiling the pressurized water.

In a second aspect, a system that thermally services a solvent-refining column comprises: a first column containing at least a solvent and impurities, the first column having a top and a bottom; a closed-loop water-steam system running past the top and the bottom of the first column, the closed-loop water-steam system comprising: a first condenser connected to the top of the first column; a compressor connected to the first condenser; and a second condenser connected to the compressor and to the bottom of the first column.

Implementations can include any or all of the following features. The system further comprises a second column where water is separated from the solvent and the impurities. The closed-loop water-steam system further comprises a third condenser connected to the compressor and to the bottom of the second column. The system further comprises a bypass loop in the closed-loop water-steam system for selectively bypassing, at least partially, the second or third condenser. The system further comprises a heater positioned between the compressor and the third condenser. The system further comprises a bypass loop in the closed-loop water-steam system for selectively bypassing, at least partially, the first condenser. The system further comprises a heater positioned between the compressor and the second condenser. The impurities have a boiling point that is less than about 2% lower or higher than a boiling point of the solvent. The solvent is n-methyl pyrrolidone and wherein the impurities are partial oxides of the n-methyl pyrrolidone.

DETAILED DESCRIPTION

This document describes examples of systems and techniques for thermally servicing a column that performs a refinement process for a solvent, such as removing impurities from the solvent. In some implementations, a closed-loop heat pump system is provided that circulates water and steam so as to remove heat from the top of the column and add heat at the bottom of the column. For example, when the boiling point of the impurities is very close to that of the solvent, the temperature gradient throughout the column is relatively small, leading to high energy requirements for the refinement process. Advantageously, the heat removed from the column can then be used for boiling pressurized water into vapor, and this vapor can be compressed into a higher temperature to allow energy to be returned into the column for the process.

Figure 1:
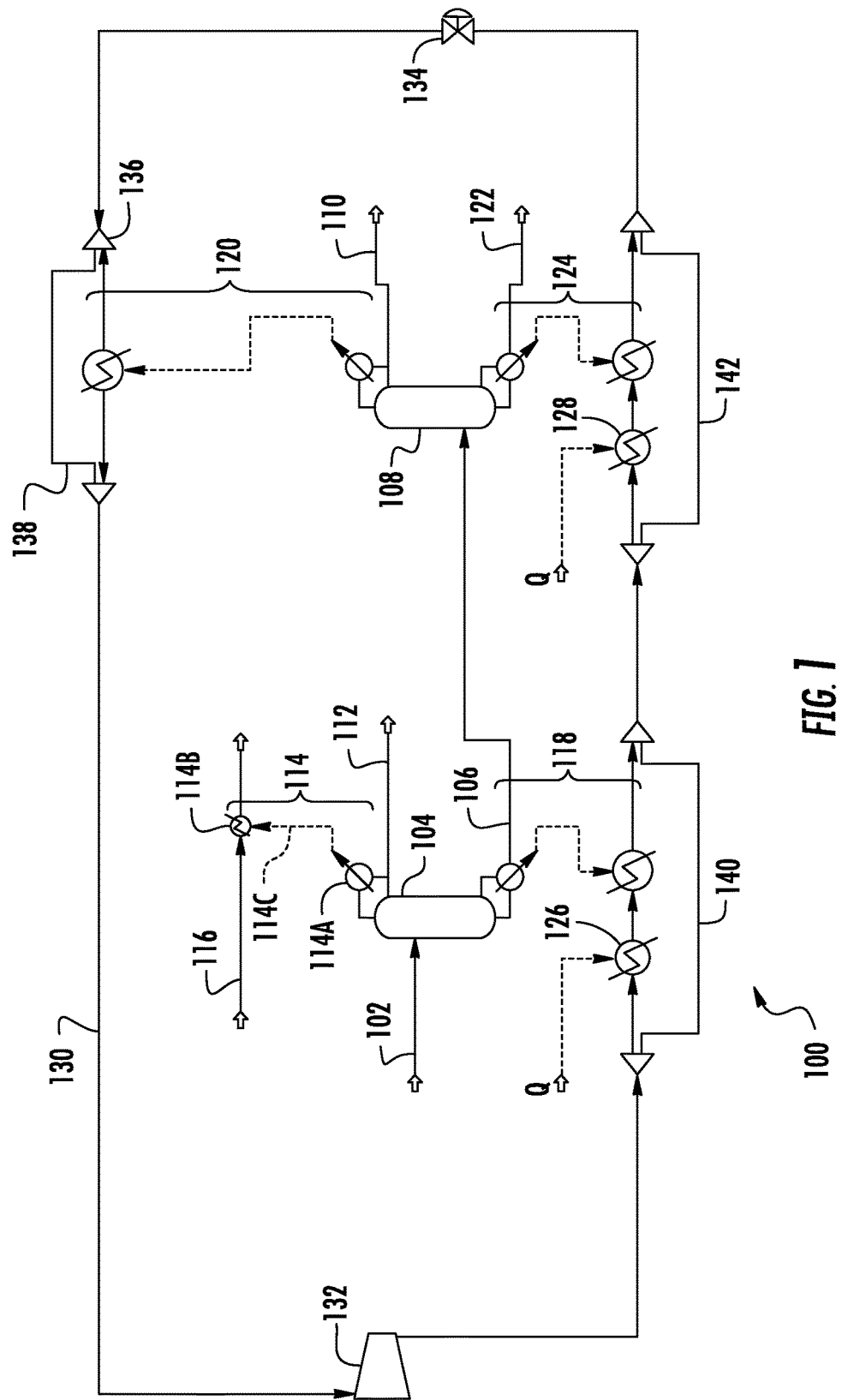
FIG. 1 shows an example of a process flow.

FIG. 1 shows an example of a process flow 100. The flow schematically shows a number of components that can be installed in a suitable environment, such as in an industrial context where there is a need for refining solvents. The illustration also shows the flows of matter or energy that can occur between them. As such, the system can include pipes, tubes, pumps, hoses and/or any other type of conduit, that are useful for conveying matter in the various states described herein. These components are not shown here for clarity.

The process flow 100 can include the following components. An inlet 102 supplies a liquid mixture that is to be refined. For example, the mixture can include solvent, water and impurities. The inlet is connected to a first column 104, which can be any fractionating column, such as a distillation column, that separates materials based on difference in boiling point. For example, the column includes trays or plates or other dividers that serve to separate vaporized compounds from the heated mixture. An outlet 106 supplies liquid from the first column to a second column 108. For example, the liquid can include solvent and impurities. The second column can be similar in structure to the first column or can have a different design. An outlet 110 provides output from the second column. For example, this output can include refined solvent.

The first column 104 has another outlet 112. For example, this outlet can convey water vapor from the first column. A first heat exchanger 114 provides thermal conditioning of at least a part of the first column, such as the top thereof. Any type of heat exchanger can be used in the system. Here, the first heat exchanger is schematically shown as consisting of a heat exchanger part 114A that is in thermal contact with a condenser part 114B such that a heat flow 114C can occur between them. An inlet 116 provides a fluid to the opposite side of the heat exchanger from the first column. For example, water can be used. A second heat exchanger 118 provides thermal conditioning of at least a part of the first column 104, such as at the bottom thereof. For example, the second heat exchanger can serve as a reboiler for the first column.

Similarly, for the second column 108, a third heat exchanger 120 provides thermal conditioning of at least a part thereof, such as its top. The second column has another outlet 122. For example, this outlet can convey impurities from the second column. A fourth heat exchanger 124 provides thermal conditioning of at least a part of the second column, such as the bottom thereof.

A process flow can include one or more heaters. In some implementations, the heaters are electric, but any suitable form of heating element can be used. For example, a first electric heater 126 is here arranged before the second heat exchanger 118; also, a second electric heater 128 is here arranged before the fourth heat exchanger 124.

The heat exchangers and the electric heater are here part of a closed loop system 130 that can serve as a heat pump system. In some implementations, the working fluid for the heat pump should have one or more of: a saturation temperature of about 120-150° C. in the pressure range of about 1-5 atm, a very high latent heat of vaporization, a high sensitivity of saturation temperature to pressure, low viscosity, low toxicity, and low cost. For example, water/steam can be used. In some implementations, the closed loop system conveys water or steam or mixtures thereof to and from one or more tops or bottoms of the first and second columns 104 and 108 to provide thermal servicing thereof. For example, this can save significant energy that would otherwise be spent on both heating the bottoms of the columns and cooling the tops thereof.

The closed loop system 130 includes a compressor 132. The compressor is arranged between the third heat exchanger 120 and the second heat exchanger 118. For example, the compressor can compress water vapor to upgrade the quality of heat and raise its saturation temperature. In some implementations, a low pressure-ratio compressor such as those used in the industry of steam mechanical vapor recompression can be used to recompress low pressure wet steam to higher pressures, and allow its condensation to service high temperature loads. The compressor can also provide circulation of the water/steam in the closed-loop system. For example, the compressor can set the compression ratio and bulk flow rate of the system.

The closed loop system 130 includes an expansion valve 134. The expansion valve is arranged between the fourth heat exchanger 124 and the third heat exchanger 120. For example, the expansion valve can throttle a water/steam mixture so that its temperature drops.

The closed loop system 130 can include one or more bypasses. A bypass valve 136 is here positioned before the third heat exchanger 120 in the flow direction. The bypass valve is controllable to selectively apportion the stream of fluid between the third heat exchanger and a bypass 138. Similarly, the second heat exchanger 118 here has a bypass 140, and the fourth heat exchanger 124 here has a bypass 142.

At a high level, the operation of the process flow 100 can occur as follows. In the third heat exchanger 120, a water/steam mixture is boiled to remove heat from the second column. That steam then enters the compressor 132 where its temperature is increased so as to be able to add heat by condensation at the bottom of a column-here, both the first and second columns. That is, the closed loop system 130 in a sense acts as a heat pump that takes heat from material at a lower temperature (e.g., the column top), compresses it to increase the temperature, and delivers heat at a higher temperature (e.g., to the bottom of at least one column).

In some implementations, the boiling points of the substances in the second column 108 are relatively close to each other. For example, they may be less than about 2% apart, or on the order of only some degrees from each other. As a result, the heat loads that are to be input and rejected at the second column can be very similar, as are their temperatures. One consequence of this is that the compressor 132 need not compress or pump the vapor to a large extent; rather, a modest compression can accomplish the temperature increase needed to let the energy from the top of the column(s) heat the bottom(s) thereof.

Figure 2:
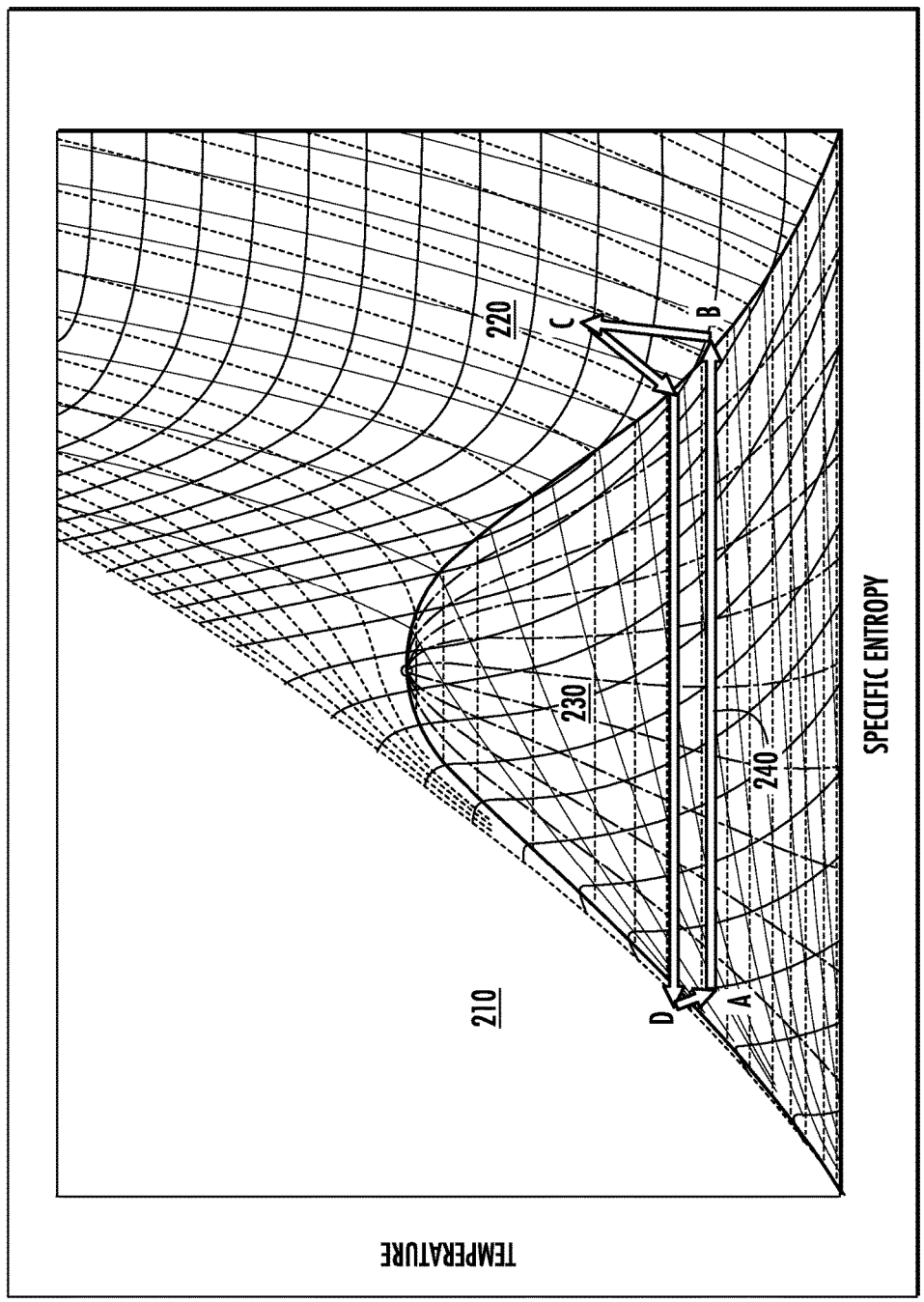
FIG. 2 shows an example temperature-entropy diagram.

FIG. 2 shows an example temperature-entropy diagram 200. This example relates to water and steam, and the temperature is here shown on the vertical axis, while the entropy is shown on the horizontal axis. Three phases are indicated: a liquid phase 210, vapor phase 220 and mixtures of liquid and vapor 230. A cycle 240 corresponds to a process that can be performed in a closed-loop system for thermally servicing solvent-refining columns, for example the system 100 in FIG. 1. The cycle shows that only a very small pressure ratio and low flow rate due to the large latent heat is required to service the loads using a water/steam working fluid. Some components of the system in FIG. 1 will be mentioned below for illustrative purposes.

Here, points A, B, C and D have been marked in the cycle 240. At A, the water/vapor mixture has a relatively low temperature. For example, this condition can occur immediately before the bypass valve 136—that is, right before the mixture reaches the heat exchanger at the top of the second column 108. The third heat exchanger 120 can in turn reject heat by boiling the near saturated liquid water stream, thereby increasing its vapor rate. That is, the flow through the third heat exchanger can correspond to a transition from A to B in the cycle 240. For example, this transition can cause the mixture to become essentially all vapor. The temperature, moreover, can remain the same or increase by a small amount only.

As noted, the vapor then passes through the compressor 132. This can correspond to a transition from B to C in the cycle 240. That is, the compressor increases the pressure and the saturation temperature of the vapor. The next part of the cycle, the transition from C to D, corresponds to the delivery of heat at the bottom of the two columns. At the point D—that is, after flowing through the heat exchanger at the bottom of the second column—the flow can be almost entirely liquid and have a temperature that is significantly lower than it had immediately after the compressor, but nevertheless higher than at the beginning of the cycle in this example (i.e., at point A). The expansion valve 134, finally, can correspond to the transition from D to A in the cycle 240. That is, the (almost entirely) liquid flow is here expanded to form a liquid-vapor mix and to decrease the saturation temperature. For example, the temperature drop is sufficient that the mixture can then absorb heat from the top of the second column as the flow cycle begins again.

The closed-loop thermal servicing can be performed on a variety of substances, including solvents of different types. The solvent can be n-methyl pyrrolidone (nMP). In some implementations, nMP is used in manufacturing certain components of the active materials that make up an electrolytic cell, such as a lithium-ion battery. In that process, the nMP can become contaminated by one or more substances. In some implementations, water and other impurities can become mixed in with the nMP, rendering it unsuitable or less efficient for further use. For example, the impurities can include oxides from partial oxidation of the nMP. A refinement process can therefore be performed to separate out the nMP.

Such a refinement process will be exemplified with reference again to the system 100 (FIG. 1). A mix of nMP, water and impurities can be introduced at the inlet 102. The water can then be removed using the first column 104 so that water (e.g., in form of vapor) passes through the outlet 112. The boiling points of water and nMP are relatively far apart, so this column has a relatively wide temperature distribution, and low energy requirements. The nMP-impurities mix, moreover, can then pass to the second column 108 by way of the outlet 106. There, the impurities can be separated from the nMP. Depending on their respective boiling points, this can be a relatively energy intensive process, where the energy removed at the top is about the same as what must be introduced at the bottom. This illustrates an advantage of using a closed-loop system for thermal service of an nMP-refining process: Rather than provide, say, electrically derived heat to the boilers and waste large amounts of rejected heat at the top, the heat can be reused at the bottom, thus significantly reducing the net heating load. The magnitudes of the heat input and rejection are similar in the second column, whereby generally a secondary cooler might be installed in a closed loop to reject the enthalpy that is added to the working fluid by the compressor. However, the reboiler load in the first column is also of the same temperature as the reboiler of the second column, and the magnitude of the load is similar to that of the compressor. As such, the heat pump system can service both reboilers in its closed loop, and a separate cooling load for the second column can be eliminated.

A number of implementations have been described as examples. Nevertheless, other implementations are covered by the following claims.

What is claimed is:

1. A system that thermally services a solvent-refining column, the system comprising:
a column wherein impurities are removed from a solvent, the column having a top and a bottom;
a first heat exchanger;
a second heat exchanger;
a compressor;
an expansion valve;
a closed-loop water-steam system having water-steam therein and connecting the first heat exchanger, the second heat exchanger, the compressor, and the expansion valve wherein:
the compressor is arranged between the first heat exchanger and the second heat exchanger;
the expansion value is arranged between the second heat exchanger and the first heat exchanger;
the first heat exchanger transfers heat to the water-steam from the top of the column;
the compressor increases a temperature of the water-steam received from the first heat exchanger;
the second heat exchanger transfers heat from the water-steam to the bottom of the column; and
the expansion valve reduces the temperature of the water-steam.

2. The system of claim 1, further comprising another column including the solvent, the impurities and water wherein the water is separated from the solvent and the impurities and a third heat exchanger arranged between the compressor and the second heat exchanger, wherein the third heat exchanger transfers heat from the water-steam to the bottom of the another column.

3. The system of claim 1, further comprising a first bypass in the closed-loop water-steam system for selectively bypassing, at least partially, the first heat exchanger.

4. The system of claim 1, further comprising a heater positioned between the compressor and the second heat exchanger wherein the heater heats the water-steam.

5. The system of claim 1, further comprising a second bypass in the closed-loop water-steam system wherein the second bypass selectively bypasses, at least partially, the second heat exchanger.

6. The system of claim 2, further comprising a heater positioned between the compressor and the third heat exchanger wherein the heater heats the water-steam.

7. The system of claim 1, wherein the impurities have a boiling point that is less than about 2% lower or higher than a boiling point of the solvent.

8. The system of claim 7, wherein the solvent is n-methyl pyrrolidone and wherein the impurities are partial oxides of the n-methyl pyrrolidone.

9. The system of claim 2, further comprising a third bypass in the closed-loop water-steam system wherein the third bypass selectively bypasses, at least partially, the third heat exchanger.

* * * * *